United States Patent Office 2,729,466
Patented Jan. 3, 1956

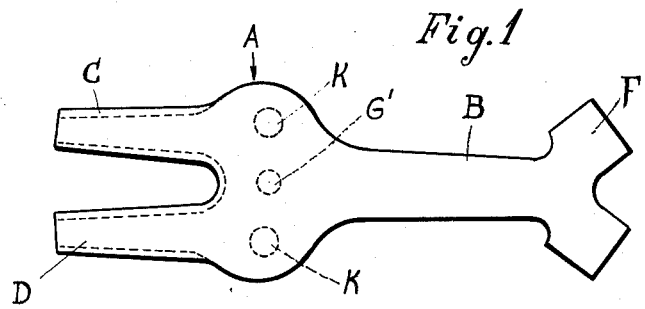
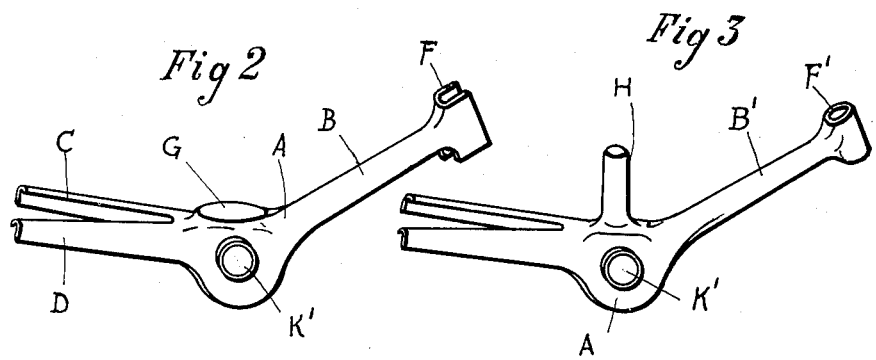
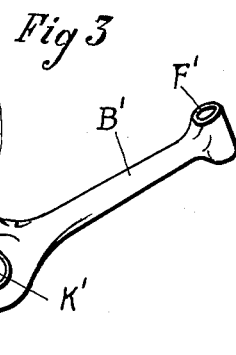
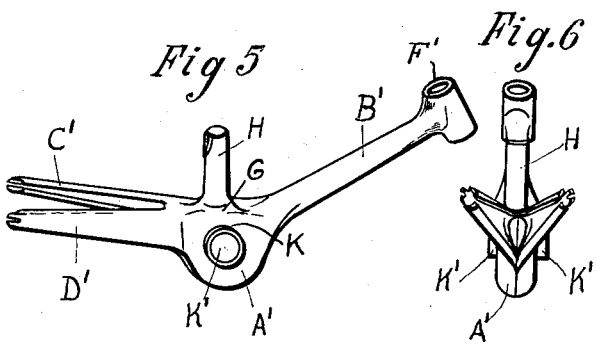
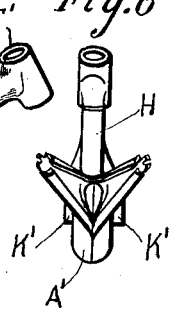
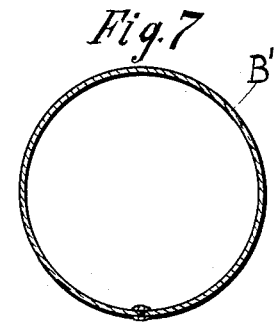
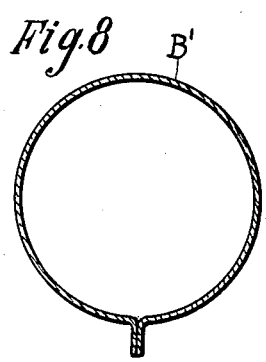
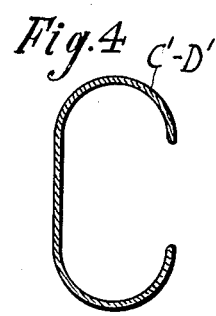

2,729,466

BICYCLE FRAME ELEMENT

Raffaele Giordani, Bologna, Italy

Application June 12, 1951, Serial No. 231,078

Claims priority, application Italy July 10, 1950

6 Claims. (Cl. 280—281)

The present invention relates to bicycle frames and more particularly to a bicycle frame made from a single sheet metal blank.

The construction of bicycle frames, particularly for bicycles used by children, should be simple so as to reduce the manufacturing cost.

It is the object of the present invention to provide a bicycle frame element requiring a minimum of stamping and forming operations so that it may be inexpensively manufactured.

With this object in view the present invention mainly consists in a bicycle frame made from a single sheet metal blank having two symmetrical halves with respect to a central line of symmetry and being formed with an aperture located on said line of symmetry. The sheet metal blank is bent about the line of symmetry so that the symmetrical halves are located opposite each other. Each of the two halves includes a dished portion having a hole and being joined to the other dished portion along a joining portion having the aperture. Each of the halves also includes an integral semi-tubular portion projecting from a dished portion together forming a tubular portion. The two holes are oppositely arranged in the casing and serve for supporting the drive shaft of the bicycle, and the central aperture is bounded by an upwardly flanged tubular edge portion to which a saddle supporting means may be attached.

Preferably, the blank is so formed that a rear wheel supporting arm projects from each of said dished portions so that the rear wheel supporting arms form a fork for supporting the shaft of the rear wheel after bending of the blank.

Preferably, a further semi-tubular portion is located at the free end of each semi-tubular projecting portion and extends substantially normal thereto so as to form a sleeve after bending of the blank for supporting the stem carrying the steering handle bar. The halves of the respective elements are joined to each other by welding.

The invention will be best understood from the following description of a specific embodiment when read in connection with the accompanying drawing, in which Fig. 1 is a plan view of a blank according to the present invention;

Figs. 2 and 3 are perspective views illustrating two consecutive steps of bending the frame;

Fig. 4 is a cross-sectional view showing a rear wheel supporting arm on an enlarged scale;

Fig. 5 is a perspective view showing a finished frame element according to the present invention;

Fig. 6 is an end view showing a finished frame element of the present invention;

Fig. 7 is a cross-sectional view showing a tubular portion on an enlarged scale; and Fig. 8 is a cross-sectional view showing a modified embodiment of a tubular portion.

Referring now to Figs. 1 to 8, the illustrated frame is formed from a single blank made of metal sheet which comprises a central zone A, and three arms B and C—D which are symmetrically arranged and adjacent.

The arm B ends with a profiled head F adapted to form, as will be explained hereafter, the sleeve in which is supported the steering stem projecting from the fork of the fore wheel.

The arm B forms the fore strut of the frame, whilst the arms C and D form the fork for the rear wheel.

The zone A is adapted to form a hollow casing connecting the arms B and C—D, and to support the driving mechanism and, at least in part, the stem for supporting the saddle.

The above described frame is preferably obtained in the following manner. From a metal sheet is cut-off the blank shown in Fig. 1 which has a longitudinally extending central line of symmetry and consists of two symmetrical halves. To this blank is given, through suitable molds, such form that the arm B is bent along its longitudinal axis to form two integral semi-tubular portions.

Also the central zone A is bent and the axis of this zone coincides with the bending axis of the arm B.

On the other hand, arms C and D form a fork after bending of the blank.

In the zone A an upper part requires a further stamping operation forming an upwardly flanged tubular edge portion G and the aperture G', for receiving a tubular saddle supporting sleeve member H (Fig. 3) forming at least a part of the central strut for retaining the saddle pin.

Before bending the side walls of the central zone A, in said walls holes K are pierced, which are successively screw-threaded in order to retain the supporting tubular element K' for the pedal shaft. By a successive operation and after having attached the tubular sleeve member H (Fig. 3), the edges of the semitubular portion F are joined so as to form the front sleeve F' for the tubular pivot of the front steering fork.

The edges of the arm B are also joined together in order to form a tubular portion B' and finally some parts of the peripheral edges of the zone A are also joined together in order to obtain a casing A' consisting of two dished portions. The other edges of the arms C and D are also bent so as they may assume a C-shaped cross-section as shown in Fig. 4.

After that the cycle frame is nearly completed and the ends of the C-shaped arms C' and D' are flattened and provided with openings for engaging the pivot of the rear wheel hub, the upper end of the tubular sleeve H is split in order to render it resilient to facilitate the insertion of the saddle pin.

The finished bicycle frame element consists, as shown in Figs. 5 and 6, of a hollow casing A' composed of two dished portions having holes K to which tubular elements K' are secured for turnably supporting the drive shaft of the bicycle. From the upwardly flanged edge portion G of the aperture G' projects the saddle supporting sleeve member H. The tubular portion B' has at the free end thereof two welded semi-tubular portions forming a sleeve F' adapted to support a stem carrying the steering handle bar. The two wheel supporting arms C' and D' of C-shaped cross-section project from the casing A' and form a fork for supporting the shaft of the rear wheel extending at an obtuse angle with respect to tubular portion B'.

When required, the various parts are provided with strengthening and stiffening ribs. The joining edges of the tube F' or arm B' and casing A', are then joined through a welding operation made, either by placing the edges to be welded one in the front to the other, as shown by Fig. 7, or by bending said edges so as to form a longitudinal rib (Fig. 8) on which the welding is effected.

In this latter case, welding will be of the electric resistance type.

In practical embodiments details may be varied in any way without departing from the essence of the invention.

What I claim is:

1. A bicycle frame element made from a single elongated sheet metal blank having two symmetrical halves with respect to a longitudinally extending central line of symmetry, the frame element being bent about said central line and having symmetrical halves located opposite each other and having the free edges thereof bent toward each other, each of said two symmetrical halves including a dished portion having one hole, and being joined to the other dished portion along a joining portion having an aperture, each of said halves also including an integral semi-tubular portion projecting from said dished portion in one direction, the two dished portions forming a hollow casing having said holes oppositely arranged, aligned, and adapted to support the drive shaft of a bicycle, and also adapted to support on said flanged tubular edge portion of said aperture a saddle supporting means, and the two semi-tubular portions forming a tubular portion adapted to support a stem carrying a steering handle bar.

2. A bicycle frame element made from a single elongated sheet metal blank having two symmetrical halves with respect to a longitudinally extending central line of symmetry, the frame element being bent about said central line and having symmetrical halves located opposite each other and having the free edges thereof bent toward each other, each of said two symmetrical halves including a dished portion having one hole, and being joined to the other dished portion along a joining portion having an aperture, each of said halves also including an integral semi-tubular portion projecting from said dished portion in one direction, and a rear wheel supporting arm projecting from each of said dished portions in a direction opposite to said one direction at an obtuse angle to said semi-tubular portion, the two dished portions forming a hollow casing having said holes oppositely arranged, aligned, and adapted to support the drive shaft of a bicycle, and also adapted to support on said flanged tubular edge portion of said aperture a saddle supporting means, and the two semi-tubular portions forming a tubular portion adapted to support a stem carrying a steering handle bar and the two rear wheel supporting arms forming a fork for supporting the shaft of a rear wheel.

3. A bicycle frame element made from a single elongated sheet metal blank having two symmetrical halves with respect to a longitudinally extending central line of symmetry, the frame element being bent about said central line and having symmetrical halves located opposite each other and having the free edges thereof bent toward each other, each of said two symmetrical halves including a dished portion having one hole, and being joined to the other dished portion along a joining portion having an aperture, each of said halves also including an integral semi-tubular portion projecting from said dished portion in one direction, a further semi-tubular portion located at the free end of said semi-tubular projecting portion and extending substantially normal thereto, and a rear wheel supporting arm project from each of said dished portions in a direction opposite to said one direction at an obtuse angle to said semi-tubular portion, the two dished portions forming a hollow casing having said holes oppositely arranged, aligned, and adapted to support the drive shaft of a bicycle, and also adapted to support on said flanged tubular edge portion of said aperture a saddle supporting means, and the two semi-tubular portions forming a tubular portion, and the two further semi-tubular portions forming a sleeve adapted to support a stem carrying a steering handle bar and the two rear wheel supporting arms forming a fork for supporting the shaft of a rear wheel.

4. A bicycle frame element as set forth in claim 3 wherein each of said two rear wheel supporting arms has C-shaped cross-section, said rear wheel supporting arms being arranged with the concave sides thereof facing each other.

5. A bicycle frame element as set forth in claim 3 and wherein said saddle supporting means is a sleeve welded to said upwardly flanged tubular edge portion of said aperture.

6. A bicycle frame element as set forth in claim 5 and including two tubular elements, each tubular element being secured to said casing in one of said holes in said dished portions.

References Cited in the file of this patent

UNITED STATES PATENTS

| 397,405 | Warwick | Feb. 5, 1889 |
| 448,655 | Jeffery | Mar. 24, 1891 |
| 2,089,889 | Giordani | Aug. 10, 1937 |
| 2,158,075 | Loftfield | May 16, 1939 |
| 2,353,712 | Dewey | July 18, 1944 |
| 2,378,961 | Wallace et al. | June 26, 1945 |
| 2,435,448 | Kraeft et al. | Feb. 3, 1948 |
| 2,493,037 | Simon | Jan. 3, 1950 |

FOREIGN PATENTS

| 864,069 | France | Apr. 17, 1941 |
| 14,617 | Great Britain | of 1893 |
| 535,968 | Great Britain | Apr. 29, 1941 |
| 191,124 | Switzerland | Aug. 2, 1937 |